United States Patent [19]

Stevens et al.

[11] 4,437,595
[45] Mar. 20, 1984

[54] FEEDING APPARATUS FOR FISH AND OTHER ANIMALS

[75] Inventors: Perry Stevens, West Covina; Robert E. Brown, Rosemead, both of Calif.

[73] Assignee: A.F.C.S., Inc., City of Industry, Calif.

[21] Appl. No.: 347,895

[22] Filed: Feb. 11, 1982

[51] Int. Cl.³ .............................................. A01K 5/02
[52] U.S. Cl. .................................. 222/642; 222/644; 119/51.11
[58] Field of Search ..................... 222/650; 119/51.11, 119/51.13; 222/243, 242, 362, 248, 642, 644, 639, 643

[56] References Cited

U.S. PATENT DOCUMENTS

| 2,723,783 | 11/1955 | Ewin | 222/248 |
| 3,256,861 | 6/1966 | Giltner | 222/643 X |
| 3,416,497 | 12/1968 | Riel | 119/51.11 |

Primary Examiner—Stanley H. Tollberg
Attorney, Agent, or Firm—Boniard I. Brown

[57] ABSTRACT

An apparatus for dispensing fluent materials such as fish food including one or more chambers for receiving the fluent material having a bottom with an opening therein which cooperates with an opening in a slide member to dispense the fluent material upon reciprocating movement of the slide member. An adjustable throw solenoid recirpocates the slide member for a short time period determined by an adjustable period timer upon initiation by a daily timer.

3 Claims, 7 Drawing Figures

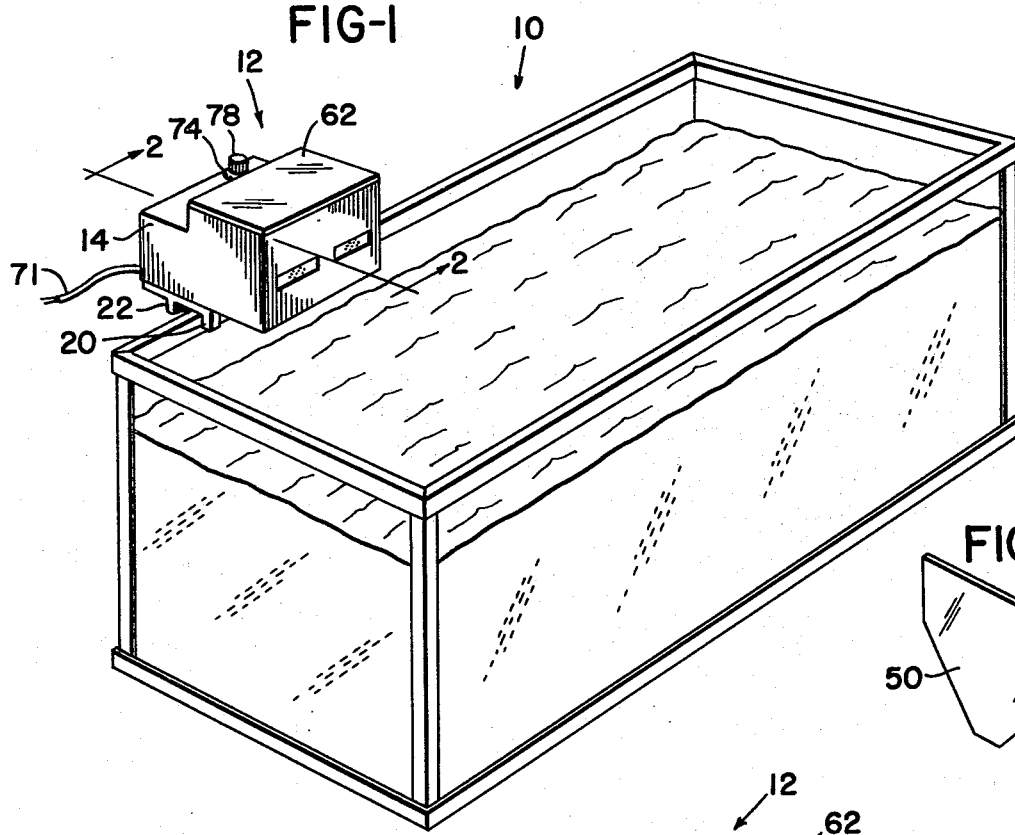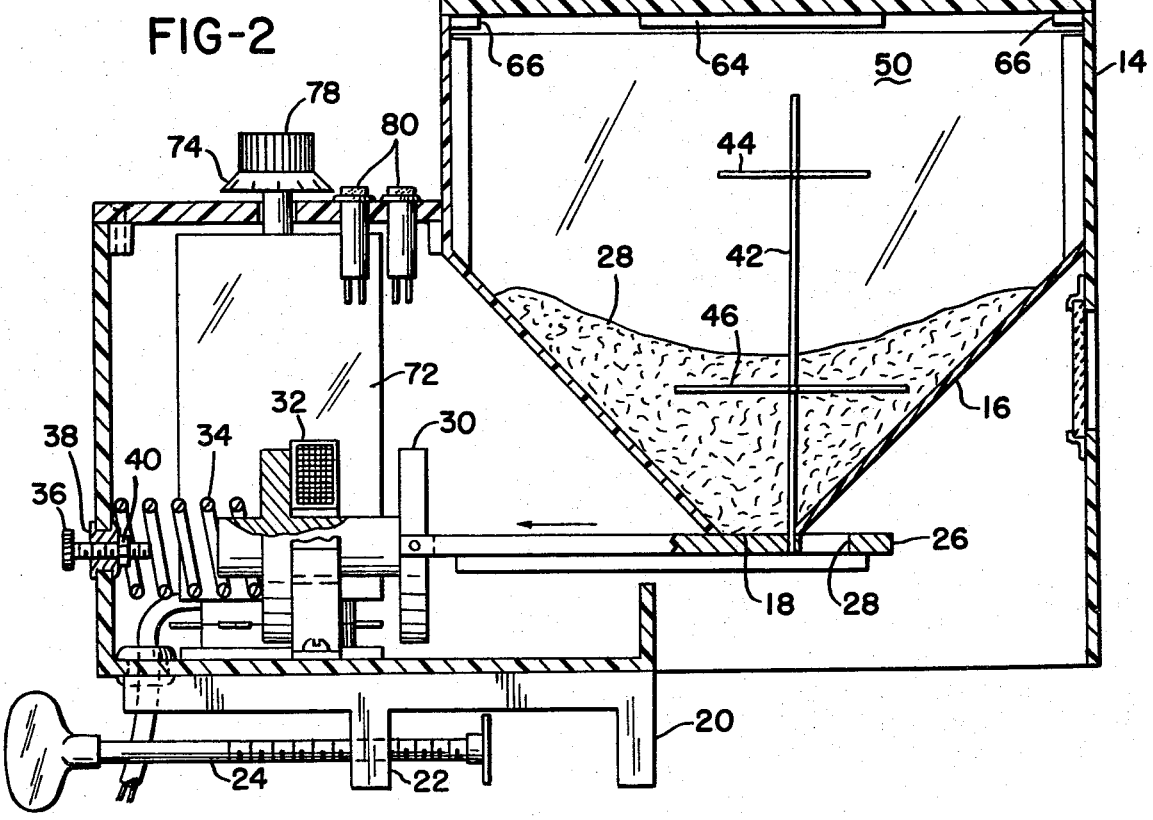

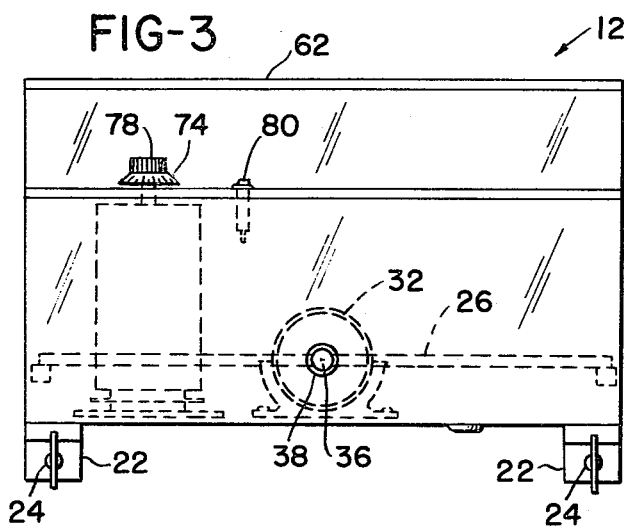
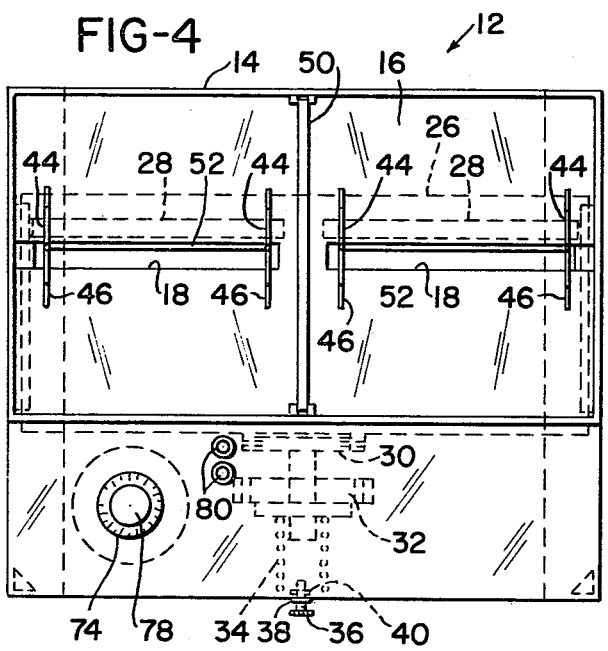
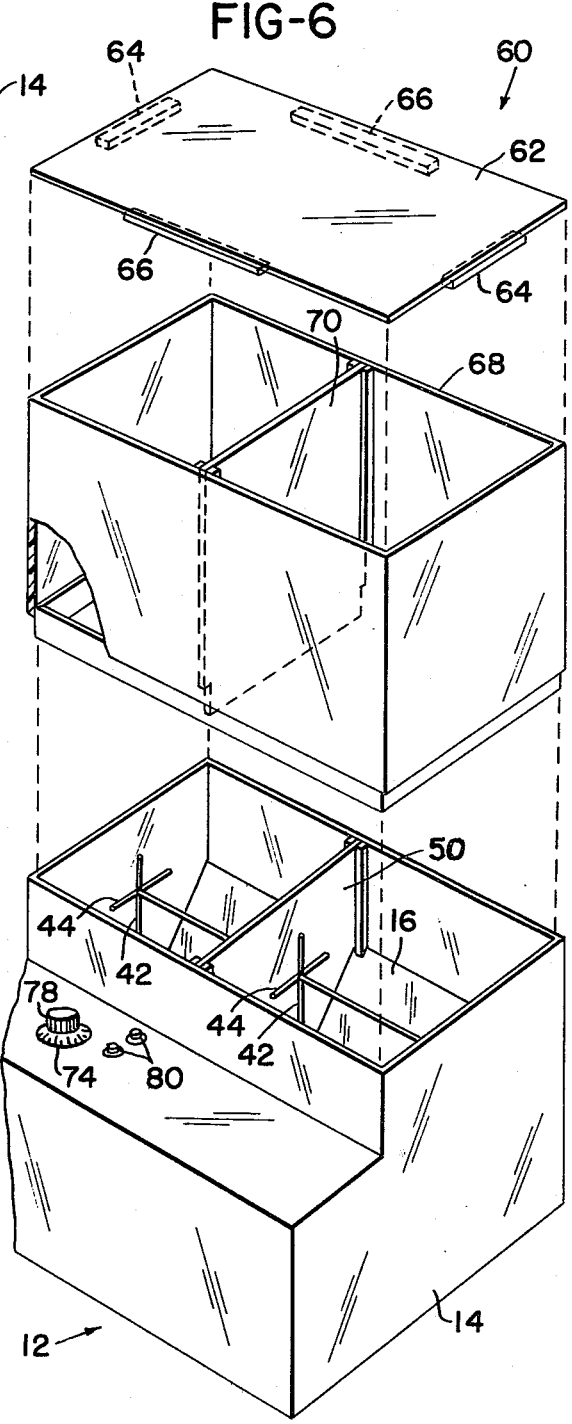
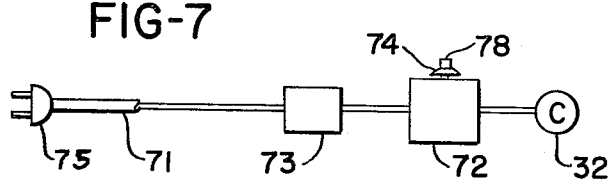

FEEDING APPARATUS FOR FISH AND OTHER ANIMALS

BACKGROUND OF THE INVENTION

The invention relates to dispensers for fluent matter, such as many food stuffs. Although having particular application to foods typically supplied to fish in domestic as well as commercial aquariums, it will be understood to also have application to apparatus for feeding dogs, cats, gerbils, and other animals. The invention also has application to apparatus for feeding goats, cows, pigs and other animals raised commercially.

The owners of fish and other animals are often constrained in their travel plans and other activities by the feeding schedules of their pets. It is of great importance for many people to be able to vary their personal schedules without altering the feeding schedule for their animals. The use of a standardized feeding cycle at, such as one feeding per day at a given time, is desirable because of the natural rhythm of many animals as well as the desirability of humane treatment of animals.

The apparatus which has been available prior to the present time, has in general not been wholly satisfactory because the common form of prior art apparatus uses a solenoid operated gate or valve to dispense a food stuff. The quantity of food stuff is varied by altering the stroke of the gate or other valve which is operated by a solenoid. The stroke is varied by positioning a physical stop such as a screw or bolt which can be rotated to vary the adjustment. In other forms the opening size is varied. Apparatus of the general types described are shown in U.S. Pat. Nos. 3,416,497 and 2,772,659.

It is an object of the invention to provide apparatus which facilitates the rapid adjustment of food stuff quantity without the necessity for using any tools to make the adjustment.

It is another object of the invention to provide means for agitating the fluent material which is being dispensed to avoid caking or other lodging of the fluent material.

It is another object of the invention to provide apparatus which may be constructed in large part from off-the-shelf apparatus.

SUMMARY OF THE INVENTION

The foregoing objects and other objects and advantages which shall become apparent from the detailed description of the preferred embodiment are attained in a dispensing apparatus for dispensing an associated fluent material which includes holding means for receiving the fluent material, having a top and a bottom. The bottom has an opening therein and cooperates with a slide member having an opening therein and mounted for movement (adjacent to the bottom of the holding means) between a first position, wherein the opening of the holding means and the opening of the slide member are disposed in at least partially registered relationship to allow passage of the fluent material through both the openings, and a second position, wherein the openings are not in registered relationship and passage of a fluent material out of the holding means is prevented. The apparatus also includes solenoid operating means for moving the slide member, and timing means cooperating with the solenoid operating means to move the slide member from the second position to the first position and back to the second position in a predetermined time period. The timing means includes a first timing mechanism which is adjustable to vary the predetermined time period.

In one form the timing means include a second timing mechanism having a twenty-four hour cycle and which arms the first timing mechanism at least once during a twenty-four period. An agitating structure extends from the slide member through the opening in the holding means. This structure agitates the fluent material upon movement thereof to ensure the fluent material feeds properly. In one form the agitating structure is generally T-shaped, having a vertical member and at least one cross-member.

BRIEF DESCRIPTION OF THE ACCOMPANYING DRAWING

FIG. 1 is a perspective view of an aquarium on which the apparatus, in accordance with the invention, has been installed;

FIG. 2 is a sectional elevational view of the dispenser apparatus taken along the line 2—2 of FIG. 1, illustrated in FIG. 1;

FIG. 3 is a rear elevational view of the dispenser apparatus illustrated in FIG. 1;

FIG. 4 is a plan view of the dispenser apparatus illustrated in FIG. 1;

FIG. 5 is a perspective view of a divider element which is used in the dispenser apparatus;

FIG. 6 is an explodd perspective view of the dispenser apparatus in FIG. 1 together with an additional hopper structure intended to increase the holding capacity of the apparatus in accordance with the invention; and FIG. 7 is a schematic of the electrical portions of the dispenser apparatus in accordance with the invention.

DESCRIPTION OF THE PREFERRED EMBODIMENT

Referring now to FIGS. 1-6, there is shown an aquarium 10 on which the dispenser apparatus 12 is mounted. The dispenser apparatus 12 is provided with a housing 14 is preferably manufactured of a clear plastic material. The housing 14 includes a hopper shaped portion 16 having an opening extending across the bottom thereof. The hopper 16 has sloping walls which extend generally outwardly. The housing is provided with depending lips 20, 22 which cooperate with a thumb screw 24 for locking the dispenser apparatus 12 on an associated aquarium 10 and/or other similar apparatus. Mounted for reciprocal movement adjacent to the opening 18 of the hopper 16 is a slide member 26 having an opening therein. The slide member 26 is mounted to allow movement which is generally horizontal. More specifically, the slide member 26 is moveable between a first position wherein the opening 28 is disposed in at least partially registered relationship with the opening 18 of the hopper 16. The slide member is also moveable to a second position, shown in FIG. 2, wherein the opening 28 and the opening 18 are not registered or aligned in any manner and the slide member blocks the passage of the fluent material 28 out of the hopper 16.

The slide member 26 is fixed to an armature 30 which cooperates with a solenoid winding 32. The solenoid winding 32 when energized produces a force to urge the slide member 26 to the left as viewed in FIG. 2. The movement of the slide member 26 to the left is against the bias of a coil spring 34 which urges the slide member 26 to the right (as viewed). A travel limit adjustment screw 36 cooperates with a grommet 38 in the wall of the housing 14 and a lock nut 40 which secures the limit travel adjustment screw 36 in place.

Extending upwardly from the slide member 26 is an agitating or jostling structure which includes a vertical member 42 and spaced generally parallel cross members 44 and 46. In the preferred embodiment the cross member 46 is somewhat longer than the cross member 44 and is disposed in parallel relationship to the slide member 26 and closer to the slide member 26 than is the cross member 44. As best seen in FIGS. 4 and 6, th apparatus may include two discrete chambers within the hopper 16 defind by a divider 50 illustrated best in FIG. 5. Each chamber may have a jostling mechanism to ensure that fluent material does not collect in corners or elsewhere and does pass under the influence of gravity out through the opening 18. The jostling structure may include cross members 44 which are each fastened to vertical uprights 42 and which ar joined by a brace 52.

As best seen in FIG. 6, the apparatus may in one variation include an add-on hopper extension 60 which includes a cover 62 which includes keepers 64, 64, 66, and 66. In those forms of the invention not utilizing the add-on hopper 60, the cover 62 may be positioned directly on top of the dispenser apparatus 12. The add-on hopper 60 includes an extender section 68 having a center divider 70. The walls of the divider 70 and the add-on extension 68 are dimensioned for positioning in an aligned relationship, respectively, with the housing walls and divider 50 of the dispenser apparatus 12.

The apparatus also includes an electric circuit for energizing the solenoid coil 32 to move the slide member 26 against the bias of the coil spring 34 until it reaches the limit imposed by the limit travel adjustment screw 36.

The apparatus includes a twenty-four hour time control mechanism 73 which is connected via a cord 71 to a plug 75. The twenty-four hour timer 73 may be of conventional design and such as that commonly sold for switching lights in residences. The timer 73 provides power during preselected time intervals to an adjustable timing relay 72. The adjustable timing relay 72 may be any of various solid state, general purpose timing relays, such as that made by Magnecraft Electric Company. The adjustable timing relay is provided with a dial 74 rotable by a knob 78 for adjustment of the duration of power application to the solenoid coil 32. Such apparatus typically has adjustment ranges measured in fractions of a second. The utilization of such adjustable timing relays facilitates the easy adjustment of the quantity of fluent material 28 which is dispensed and ensures also that the positioning of the knob 78 will give repeatable results. It will be understood that the adjustable timing relay 72 is not armed until the time 73 has the contacts therein (not shown) closed, after which the adjustable timing relay 72 will close for the preselected time interval to energize the solenoid coil 32 and thus produce the desired interval of registration between the openings 28 and 18. Indicator lights 80 may be provided to indicate the operating status of the apparatus.

It will be seen that the amount of food or other material 28 which is discharged may be easily varied. Advantageously, the apparatus simultaneously agitates the fluent material with the actual discharge and accomplishes this with a minimum of physical structure. It will be understood that the apparatus has application to the dispensing of any fluent material.

The invention has been described with reference to its illustrated preferred embodiment. Persons skilled in the art of constructing feeding apparatus may, upon exposure to the teachings herein, conceive variations in the mechanical development of the components therein. Such variations are deemed to be encompassed by the disclosure, the invention being delimited only by the appended claims.

The inventor claims:

1. Dispensing apparatus for dispensing an associated fluent material which comprises:
    at least first and second housing means for receiving the fluent material, each housing means having a top and a bottom, said bottom having an opening therein;
    a slide member having at least first and second openings therein, said slide member being mounted for movement adjacent to said bottoms of each of said first and second housing means between a first position wherein said openings of said first and second housig means and said first and second openings respectively of said slide member are in at least partially registered relationship to allow passage of the fluent material through said openings, and a second position wherein said openings are not in registered relationship and passage of a fluent material out of said holding means is prevented;
    adjustable solenoid means for moving said slide member including throw adjusting means to allow control of said at least partially registered relationship of said openings;
    first timing means connected to control said adjustable solenoid operating means to move said slide member from said second position to said first position and back to said second postion for a predetermined time period; and
    second timing means connected to initiate operation of said first timing means at a chosen time of day.

2. The apparatus as described in claim 1 further including:
    an agitating structure extending from said slide member through said openings in said first and second housing means, said structure agitating the fluent material upon movement thereof with said slide member to ensure proper feed of the fluent material in said first and second housing means.

3. The apparatus as described in claim 2, wherein:
    said agitating structure includes a member parallel to the flow of fluent material and at least one member perpendicular to the flow of fluent material.

* * * * *